United States Patent
Saaf

(10) Patent No.: US 7,548,840 B2
(45) Date of Patent: Jun. 16, 2009

(54) EFFICIENT APPLICATION OF REDUCED VARIABLE TRANSFORMATION AND CONDITIONAL STABILITY TESTING IN RESERVOIR SIMULATION FLASH CALCULATIONS

(75) Inventor: Fredrik E. Saaf, Delft (NL)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 11/758,215

(22) Filed: Jun. 5, 2007

(65) Prior Publication Data
US 2007/0282582 A1 Dec. 6, 2007

Related U.S. Application Data

(60) Provisional application No. 60/811,642, filed on Jun. 6, 2006.

(51) Int. Cl.
G06F 17/10 (2006.01)
(52) U.S. Cl. .............................. 703/10; 703/2
(58) Field of Classification Search ................ 703/10, 703/2
See application file for complete search history.

(56) References Cited

OTHER PUBLICATIONS

S. Mokhatab, Three-Phase Flash Calculation for Hydrocarbon Systems Containing Water, 2003, Theoretical Foundations of Chemical Engineering vol. 37, No. 3, pp. 291-294.*
Claus P. Rasmussen, et al, Increasing Computational Speed of Flash Calculations With Applications For Compositional, Transient Simulations; SPE 84181; 2003.

* cited by examiner

Primary Examiner—Paul L Rodriguez
Assistant Examiner—Luke Osborne
(74) Attorney, Agent, or Firm—Christopher D. Northcutt

(57) ABSTRACT

Methods and computer readable media for performing a compositional reservoir simulation of a subterranean hydrocarbon-bearing reservoir is provided. Reduced variables for flash computations are utilized with a methodology of conditional stability testing for achieving optimal efficiency of phase behavior computations in a compositional reservoir simulator. A least abundant phase is selected as primary variables for a primary phase and a secondary phase is selected for a more abundant phase to ensure stability by not dividing by a value near zero due to the selection of the primary phase as being associated with phase which is the least abundant. A bounded interval may be used to limit solution changes in reduced variable algorithms to achieve greater stability of algorithms. Stability tests may be performed during flash computations using reduced variables by employing a direct residual form based on the definition of the reduced variables and the tangent-plane distance condition.

8 Claims, 7 Drawing Sheets

Reduced Variable limits illustration for the case m=1

Subsequent points (Q1,Q2,Q3) must lie in the box:
Q1,min < Q1 < Q1,max
Q2,min < Q2 < Q2,max
Q3,min < Q3 < Q3,max For the stability test, number of unknowns is M=m+1=2
And only the first two dimensions are used
whereas for the split calculation, the number of
unknowns is M+1 =3

EFFICIENT APPLICATION OF REDUCED VARIABLE TRANSFORMATION AND CONDITIONAL STABILITY TESTING IN RESERVOIR SIMULATION FLASH CALCULATIONS

RELATED APPLICATION

This nonprovisional application claims the benefit of copending provisional patent application U.S. Ser. No. 60/811,642, filed on Jun. 6, 2006, which is hereby incorporated by reference in its entirety.

TECHNICAL FIELD

The present invention relates generally to computer enabled reservoir simulation of fluid flow in subterranean reservoirs and more particularly, to compositional reservoir simulation.

BACKGROUND OF THE INVENTION

Conceptually a compositional reservoir simulator for simulating flow in a subterranean hydrocarbon-bearing reservoir can be viewed as modeling a series of connected mixing tanks of fluids (cells) at given pressure, temperature and compositions. As time evolves (as the simulator is taking time-steps toward some final time at which results are sought), conditions in the tanks change as a result of fluid movement, wells and other external factors. Flash calculations are necessary to establish, for each new set of pressure, temperature and overall fluid composition, the number of fluid phases, their amounts and compositions. This calculation fundamentally involves finding the minimum of a thermodynamic state function (the Gibbs Free Energy (GFE), and as such is iterative in nature and frequently difficult to converge and computationally expensive, particularly when detailed fluid models are used, i.e., when there are many hydrocarbon components present. There is therefore great interest in devising algorithms which are computationally efficient yet robust and accurate.

For the purpose of discussion, the activity performed in "flash" calculation shall be subdivided into stability testing, which attempts to reveal instability of a given phase at the current conditions; and split calculations, which aims at determining the equilibrium phases and compositions for an assumed phase configuration.

One approach to increasing the efficiency of flash calculations in a computational reservoir simulator is described by Claus P. Rasmussen, Kristian Krejbjerg, Michael L. Michelsen and Kersti E. Bjurstrom, *Increasing the Computational Speed of Flash Calculations with Applications for Compositional*, Transient Simulations, Society of Petroleum Engineers, SPE 84181, February 2006 SPE Reservoir Evaluation & Engineering. In performing flash calculations, the majority of time is spent doing stability analysis. Rasmussen et al. proposed criterion for bypassing many of the stability analysis checks.

Referring to FIG. 1, a pressure-temperature map is shown for a fluid in a cell. Point A is shown in a two-phase region where both a gas phase and a liquid phase exist. Point B is located on a transition line between a two-phase region and a one phase region (the phase boundary). Point C is located in a "shadow zone" of the one-phase region, close to the two-phase region. Finally, point D lies in a "remote" region far into the single-phase domain. Also, a vertical line is shown which separates single-phase liquid on the left and on the right is single-phase gas. Depending on where the estimated phase state of fluid in a cell, certain stability calculations may be omitted rather than performing stability analysis for all cells during iterations in a time. This general criterion for bypassing calculations shall be described in greater detail below with respect to the stability testing in Section 5.

The sub-steps corresponding to "split" and "stability" calculation described in Rasmussen et. al. use a "traditional" approach, with the attendant solution of nonlinear problems of size equal to the number of hydrocarbon components. There is scope for improving the efficiency of these sub-steps, particularly for simulation models involving a large number of components.

Firoozabadi, A. and Pan, H., *Fast and Robust Algorithm for Compositional Modeling: Part I—Stability Analysis*, SPE 63083 and Firoozabadi, A. and Pan, H., *Fast and Robust Algorithm for Compositional Modeling: Part II—Two-Phase Flash*, SPE 71603 discuss the application of reduced variable strategies for stability and split calculations in compositional reservoir simulation; however the authors do not teach how stability tests can be avoided. Also, the particular stability algorithm, as formulated, may experience convergence difficulties, particularly when encountering conditions far into the undersaturated zone. In addition, the split algorithm is formulated in terms of the vapor phase and will exhibit numerical and/or convergence difficulties near dew-points, due to the virtually non-existent liquid phase.

Newton's method is commonly used in solving nonlinear systems of equations. Care must be taken to ensure that iterates do not exceed physical bounds on the unknowns. In applying Newton's method to problems in phase behavior formulated in terms of reduced variables, there is a need to ensure that physical bounds on the reduced variables are not violated.

The shortcomings of previous methods for compositional reservoir simulations cited above will be addressed by the detailed description of the invention that follows below.

SUMMARY OF THE INVENTION

A method, system and computer readable media carrying instructions for performing a compositional reservoir simulation of a subterranean hydrocarbon-bearing reservoir is provided. Reduced variables for flash computations are utilized, combined with a methodology of conditional stability testing for the purpose of achieving optimal efficiency of phase behavior computations in a compositional reservoir simulator. Also, preferably a least abundant phase is selected as primary variables associated with a primary phase and a secondary phase is selected for a more abundant phase such that stability is ensured by not dividing by a value near zero due to the selection of the primary phase as being associated with phase which is the least abundant. Also a bounded interval may be used to limit solution changes in reduced variable algorithms (phase split and stability) to achieve greater stability of algorithms. Further, stability tests may be performed during flash computations using reduced variables by employing a direct residual form based on the definition of the reduced variables and the tangent-plane distance condition.

It is an object of the present invention to combine the concept of reduced variables for flash computations with a methodology of conditional stability testing for the purpose of achieving optimal efficiency of phase behavior computations in a compositional reservoir simulator.

It is an object of the present invention to provide a more reliable reduced-variable phase-split algorithm by selecting primary variables corresponding to the least abundant phase present;

It is another object to use a bounded interval to limit solution changes in the reduced variable algorithms (phase split and stability) to achieve greater stability of the algorithms and/or avoid excessive iterations.

It is yet another object to provide an enhanced method for performing stability tests using reduced variables by employing a direct residual form based on the definition of the reduced variables and the tangent-plane distance condition.

BRIEF DESCRIPTION OF THE DRAWINGS

These and other objects, features and advantages of the present invention will become better understood with regard to the following description, pending claims and accompanying drawings where:

DETAILED DESCRIPTION OF THE INVENTION

The following nomenclature shall be used with the equations that follow:

| Symbols | |
|---|---|
| $\overline{D}$ = | Tangent Plane Distance (TPD) |
| G = | Gibbs Free Energy function (GFE) |
| c = | Number of hydrocarbon components |
| m = | Number of non-zero Eigen values |
| M = | Number of reduced parameters. Equals$^{m+1}$ |
| P = | Pressure |
| Q = | Reduced variables (M-vector) of entries$^{Q\alpha}$ |
| Q = | Reduction coefficients matrix of size$^{Mc}$ of entries$^{qij}$ |
| R = | Universal Gas Constant |
| T = | Temperature |
| x = | Liquid phase composition (mole fractions) |
| y = | Vapor phase composition (mole fractions) |
| Y = | Unnormalized moles of trial phase |
| z = | Feed (total) composition (mole fractions) |
| Subscripts | |
| i, j = | Component index |
| α = | Reduced variable index |
| L = | Liquid |
| V = | Vapor |
| Superscripts | |
| F = | Feed phase |
| T = | Trial phase |
| Greek symbols | |
| $\phi_i$ = | Fugacity coefficient |
| $\delta_{ij}$ = | Binary interaction coefficients (BIC) |

The teachings of Firoozabadi, A. and Pan, H., *Fast and Robust Algorithm for Compositional Modeling Part I—Stability Analysis*, SPE 63083 and Firoozabadi, A. and Pan, H., *Fast and Robust Algorithm for Compositional Modeling: Part II—Two-Phase Flash*, SPE 7160, are hereby incorporated by reference in their entireties. Similarly, the contents of U.S. patent application, 2006/0036418 to Pita et al., Highly-Parallel, Implicit Compositional Reservoir Simulator for Multi-Million-Cell Models, is incorporated by reference in its entirety. Further, the contents of Claus P. Rasmussen, Kristian Krejbjerg, Michael L. Michelsen and Kersti E. Bjurstrom, *Increasing the Computational Speed of Flash Calculations with Applications for Compositional*, Transient Simulations, Society of Petroleum Engineers, SPE 84181, February 2006 SPE Reservoir Evaluation & Engineering, are incorporated reference. Finally, the teachings contained within Michael L. Michelsen, *The isothermal flash problem, Part I. Stability*, Fluid Phase Equilbria, 9 (1982) 1-19 Michael L. Michelsen, *The Isothermal Flash Problem*, Part II, Phase-split Calculation, Fluid Phase Equilibria, 9 (1982) 21-40 are also incorporated by reference in their entireties.

Figure 4:
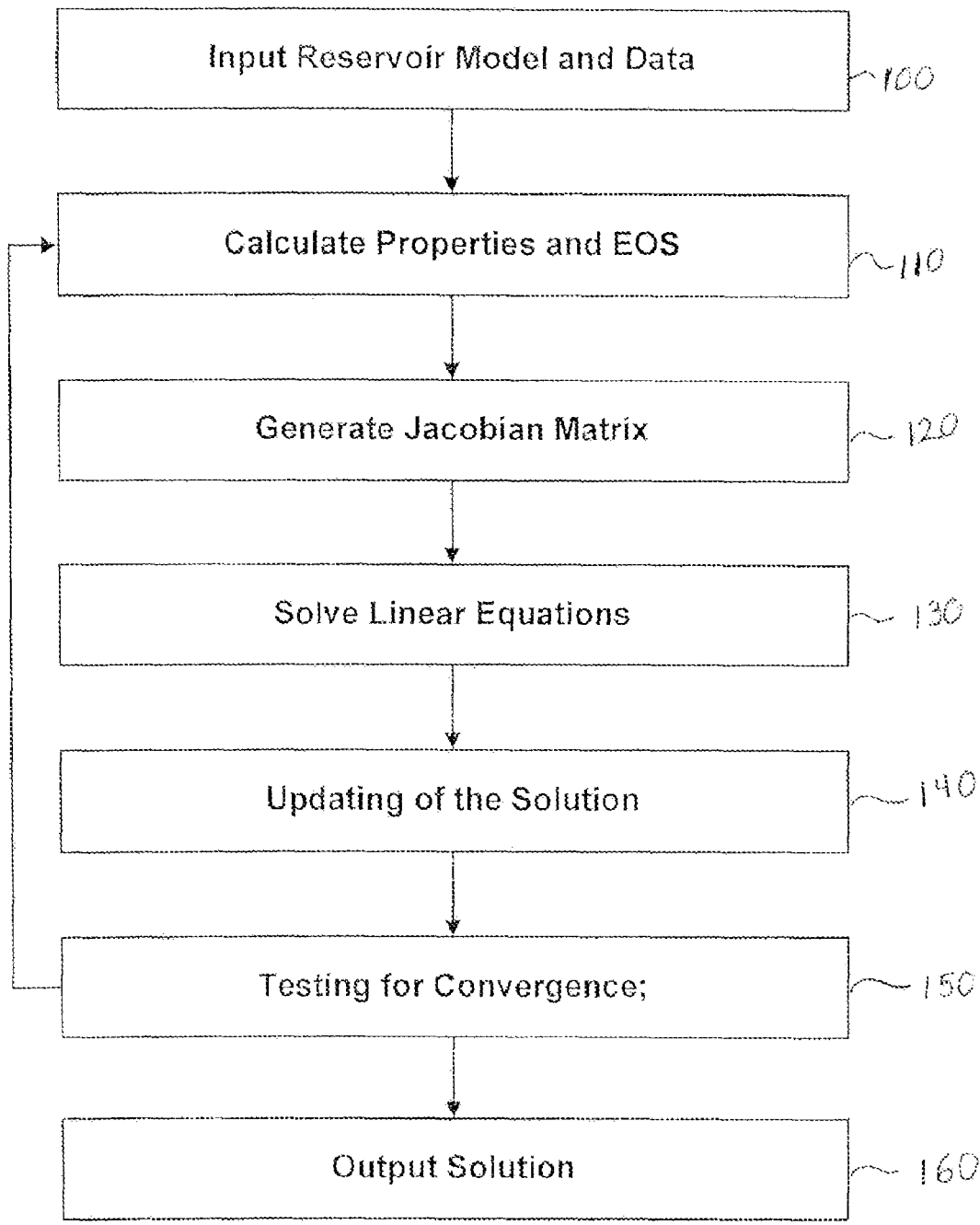
FIG. 4 is a functional block-diagram of a non-linear iteration loop including flash calculations made during computerized simulation of fluid flow, incorporating the present invention into the context of a subsurface hydrocarbon-bearing reservoir model.

FIG. 4 show the general steps taken during a non-linear iteration loop. Property and EOS calculations are made. A Jacobian matrix is then generated. A linear solver is used to solve a linear set of equations for a solution. The solution is then tested for sufficient convergence. If not sufficiently converged then new EOS and property calculations are made. Otherwise, the converged results are output.

1 Cubic Equation of State

For a pure substance an Equations of State (EOS) is a mathematical relationship between pressure, temperature and volume; for a mixture, composition is added to this relationship. The cubic form of the EOS is by far the most popular, and, in particular, the Redlich-Kwong-Soave-Peng-Robinson family of EOS has long been the industry standard in compositional reservoir simulation.

The preferred EOS is written generically in the pressure-explicit form $$P = \frac{RT}{v-b} - \frac{a(T)}{(v+m_1 b)(v+m_2 b)} \quad (1)$$

to encompass all members of this family.

In (1), parameters $m_1$ and $m_2$ are used to represent the influence of the temperature-dependent attractive term $a=a(T)$ and b is the repulsive term.

The specific EOS corresponding to parameter selections $m_1$ and $m_2$ is given below:

| EOS | $m_1$ | $m_2$ |
|---|---|---|
| Redlich-Kwong (RK) | 0 | 1 |
| Soave-Redlich-Kwong (SRK) | 0 | 1 |
| Peng-Robinson (PR) | $1+\sqrt{2}$ | $1-\sqrt{2}$ |

Defining the compressibility factor, or Z-factor, $$Z \equiv \frac{pV}{nRT} \equiv \frac{pv}{RT} \quad (2)$$

and introducing non-dimensional counterparts A,B to EOS parameters a,b through expressions $$a = \frac{A(RT)^2}{P} \quad (3)$$

$$b = \frac{BRT}{P} \quad (4)$$

a re-arrangement of (1) using the definitions (2)-(4) yields the cubic form of the EOS, $$Z^3 + e_2(A,B)Z^2 + e_1(A,B)Z + e_0(A,B) = 0 \quad (5)$$

which is solved depending on phase and other considerations for the appropriate root $Z=Z(A,B)$.

When applying the EOS to a mixture—as opposed to a pure substance—mixing rules are applied to calculate the parameters a and b (or, equivalently, A and B).

The most commonly used mixing rule for the attractive parameter is the symmetric double sum $$A = \sum_{i=1}^{c}\sum_{j=1}^{c} x_i x_j (1-\delta_{ij})(A_i A_j)^{0.5} \quad (6)$$

Here, $\delta_{ij}$ are the Binary Interaction Coefficients (BIC), accounting for chemical interactions between components of dissimilar type. It is a symmetric matrix with zero diagonal entries.

The repulsive parameter is customarily calculated as a molar average, $$B = \sum_{i=1}^{c} B_i x_i \quad (7)$$

In the expressions (6)-(7), the pure-component terms are given by:

$$A_i = \frac{\Omega_{a,i}(T)P_{r_i}}{T_{r_i}^2} \quad (8)$$

$$B_i = \frac{\Omega_{b,i}P_{r_i}}{T_{r_i}} \quad (9)$$

which introduces reduced pressures and temperatures, $P_{r_i} \equiv P/P_{c_i}$ and $T_{r_i} \equiv T/T_{c_i}$, respectively, where $T_{c_i}$ and $P_{c_i}$ denote component critical properties. The functional form of the temperature dependent function $\Omega_{a,i} = \Omega_{a,i}(T)$ depends on the EOS chosen. Using $w_i$ to designate component ascentric factor, the defining relationships are as follows:

$$\Omega_{a,i}(T) = \Omega_{a_0}/\sqrt{T_{r_i}} \text{ for } RK \quad (10)$$

$$\Omega_{a,i}(T) = \Omega_{a_0}\left[1 + (0.48 + 1.574w_i - 0.176w_i^2)\left(1-\sqrt{T_{r_i}}\right)\right]^2 \text{ for } SRK \quad (11)$$

$$\Omega_{a,i}(T) = \Omega_{a_0}\left[1 + (0.37464 + 1.54226w_i - 0.26992w_i^2)\left(1-\sqrt{T_{r_i}}\right)\right]^2 \text{ for } PR \quad (12)$$

The "corrected" form of Peng-Robinson is also supported, providing an alternative to (12) of the form $$\Omega_{a,i}(T) = \begin{cases} \Omega_{a_0}\left[1 + (0.379642 + 1.48503w_i - 0.164423w_i^2 + 0.016666w_i^3)\left(1-\sqrt{T_{r_i}}\right)\right]^2 & \text{for } w_i > 0.49 \\ \Omega_{a_0}\left[1 + (0.37464 + 1.5422w_i - 0.26992w_i^2)\left(1-\sqrt{T_{r_i}}\right)\right]^2 & \text{for } w_i \leq 0.49 \end{cases} \quad (13)$$

The term $\Omega_{b,i} = \Omega_{b_0}$ is a constant independent of temperature for the Redlich-Kwong-Soave-Peng-Robinson family of EOS. The default values of the EOS constants $\Omega_{a_0}$ and $\Omega_{b_0}$ are given by the table below—they can be overridden by the user:

| EOS | $\Omega_{a0}$ | $\Omega_{b0}$ |
|---|---|---|
| RK, SRK | 0.4274802 | 0.08664035 |
| PR | 0.457235529 | 0.07796074 |

A traditional weakness of two-parameter EOS such as (1) is frequently poor prediction of liquid density. To remedy this shortcoming, a three-parameter extension via the standard Peneloux et. al. volume shifts may be used. In this framework, the molar volume is calculated according to $$v = v^{eos} - v^{corr}$$

Here, $v^{eos}$ is the molar volume predicted by the EOS, equations (2) and (5); and the correction term is calculated from $$v^{corr} = \sum_{i=1}^{c} x_i c_i$$

where $x_i$ denotes phase composition and $c_i$ is a set of volume-shifts, related to user-supplied non-dimensional volume shifts $s_i$ according to $$c_i = s_i b_i = s_i \frac{\Omega_{b,i} RT_{c_i}}{P_{c_i}}$$

Finally, fugacity coefficients and their derivatives are fundamental building blocks in the construction of EOS algorithms. They can be calculated directly from the EOS using first principles. For an EOS of the generalized type (1) they can be show to have the form $$\ln \phi_i = -\ln(Z-B) + \frac{A}{(m_1 - m_2)B}\left(\frac{2\Sigma_i}{A} - \frac{B_i}{B}\right)\ln\left(\frac{Z+m_2 B}{Z+m_1 B}\right) + \frac{B_i}{B}(Z-1)$$

The fugacity of a component is a measure of its "tendency to escape" from a phase and therefore directly useful in equilibrium calculations, $$f_i = \phi_i x_i P$$

The condition of thermodynamic equilibrium can be expressed as $f_i^L = f_i^V$, or equivalently, $x_i \phi_i^L = y_i \phi_i^V$, from which the definition of K-values can be introduced as $K_i = y_i/x_i = \phi_i^L/\phi_i^V$.

2 Reduced Variable Approximation to the EOS

As noted above that the matrix $1-\delta_{ij}$ is symmetric and consequently endowed with a full, orthogonal set $\{\lambda_\alpha, v_i^\alpha\}$, $\alpha = 1 \ldots c$ of eigenvectors and corresponding real Eigen values. By the spectral expansion theorem this matrix can therefore be represented as a series $$1 - \delta_{ij} = \sum_{\alpha=1}^{c} \lambda_\alpha v_i^\alpha v_j^\alpha$$

The actual rank of the matrix $1-\delta_{ij}$ will depend on the number of non-hydrocarbon components present in the fluid system (specifically, how many "dissimilar" components are present) and whether the $\delta_{ij}$ have been adjusted extensively as part of the EOS tuning process.

However, in the great majority of cases, the rank is low, with many Eigen values negligible or zero.

Assuming, therefore, that any Eigen value in magnitude less than a certain drop tolerance, say $|\lambda_\alpha| < \epsilon_{tol}$, can be safely ignored without affecting predictions, an effective rank $m \approx \text{rank}(1-\delta_{ij})$ results.

An approximate representation, $$1 - \delta_{ij} \approx \sum_{\alpha=1}^{m} \lambda_\alpha v_i^\alpha v_j^\alpha \tag{15}$$

can now be introduced, which results in considerable savings in algorithms that will be introduced subsequently, provided that $m \ll c$ holds.

It is worth emphasizing that $1-\delta_{ij}$ is a constant matrix for a fixed fluid description; hence the decomposition inherent in (15) will be calculated only once and can be used in algorithms without incurring a run-time penalty.

Substituting the approximate expansion (15) into (6) produces:

$$A = \sum_{i=1}^{c}\sum_{j=1}^{c}\sum_{\alpha=1}^{m} \lambda_\alpha v_i^\alpha v_j^\alpha (A_i A_j)^{0.5} x_i x_j \tag{16}$$

Next, let $M \equiv m+1$ and introduce the matrix $Q(P,T) \in R^{M*c}$ the elements of which are defined by (14)

$$Q \equiv \{q_{ij}\} = \begin{pmatrix} v_1^1 \sqrt{A_1} & \cdots & v_c^1 \sqrt{A_c} \\ \vdots & \ddots & \vdots \\ v_1^m \sqrt{A_1} & \cdots & v_c^m \sqrt{A_c} \\ B_1 & \cdots & B_c \end{pmatrix} \tag{17}$$

With these definitions, we can write (16) as $$A = \sum_{\alpha=1}^{m} \lambda_\alpha \sum_{i=1}^{c}\sum_{j=1}^{c} q_{\alpha i} x_i q_{\alpha j} x_j = \sum_{\alpha=1}^{m} \lambda_\alpha \left(\sum_{i=1}^{c} q_{\alpha i} x_i\right)\left(\sum_{j=1}^{c} q_{\alpha j} x_j\right) \tag{18}$$

Introducing the vector $(Q_1, \ldots Q_M)$ of reduced variables, $$Q_\alpha \equiv \sum_{j=1}^{c} q_{\alpha j} x_j \quad \text{for } \alpha = 1, \ldots, M \tag{19}$$

and substituting (19) into (18), yields a particularly simple form for A and its mole-fraction derivative:

$$A = \sum_{\alpha=1}^{m} \lambda_\alpha Q_\alpha^2 \tag{20}$$

$$\sum_i \equiv \frac{1}{2}\frac{\partial A}{\partial x_i} = \sum_{\alpha=1}^{m} \lambda_\alpha q_{\alpha i} Q_\alpha \tag{21}$$

It also follows that $$B \equiv \sum_{j=1}^{c} B_j x_j \equiv \sum_{j=1}^{c} q_{Mj} x_j \equiv Q_M \tag{22}$$

For future reference, note that the physical constraints on the mole fractions, $0 \leq x_i \leq 1$, implies that the reduced variables are necessarily constrained by the min/max values of the matrix entries, i.e., $$Q_\alpha^{min} \equiv \min_j(q_{\alpha j}) \leq Q_\alpha \leq \max_j(q_{\alpha j}) \equiv Q_\alpha^{max} \text{ for } \alpha = 1, \ldots, M \quad (23)$$

It follows in particular from (23) that $$\min_j (B_j) \leq B \leq \max_j (B_j)$$

must hold.

Substituting equations (20)-(22) for A, $\Sigma_i$ and B into the original expression for fugacity coefficient, (14), the dependency is reduced from c components to the smaller set of M reduced variables, $$\ln \phi_i = (Z-1)\frac{q_{Mi}}{Q_M} - \ln(Z-Q_M) + \frac{1}{(m_1-m_2)Q_M} \left\{ 2\sum_{\alpha=1}^m \lambda_\alpha q_{\alpha i}Q_\alpha - \frac{q_{Mi}}{Q_m}\sum_{\alpha=1}^m \lambda_\alpha Q_\alpha^2 \right\} \ln\left(\frac{Z+m_2Q_M}{Z+m_1Q_M}\right) \quad (24)$$

where Z=Z(Q) follows from Z=Z(A,B) in light of equations (20) and (22).

3 Stability Test Algorithm in Reduced Variables

The stability of a mixture is determined by the Tangent Plane Distance (TPD) criterion established by Michelsen, M. L., "The Isothermal Flash Problem. Part I. Stability", Fluid Phase Equilibria 9 (1982) 1-19 which can be stated succinctly as follows:

The phase of composition z is stable at the specified P, T if and only if $$TPD(y) \equiv \sum_{i=1}^c y_i(\ln y_i + \ln \phi_i(y) - \ln z_i - \ln \phi_i(z)) \geq 0 \quad (25)$$

for any admissible trial composition y

Global minimization problems of this type are not generally directly tractable; however, a reasonable compromise is to perform a search for stationary points of (25) and verify non-negativity of the TPD at all such points.

The stationary points of the TPD can all be found among the solutions to the equations $$\ln y_i + \ln \phi_i(y) - \ln z_i - \ln \phi_i(z) = k \quad (26)$$

and a necessary condition for stability is the requirement that k≡TPD(y)≧0 at all stationary points.

A convenient change of variables $Y_i \equiv y_i \exp(-k)$ transforms (26) into c equations in the unconstrained, unnormalized moles, $$\ln Y_i + \ln \phi_i(Y) - \ln z_i - \ln \phi_i(z) = 0 \quad (27)$$

or, denoting the constant part of (27) as $d_i \equiv \ln z_i + \ln \phi_i(z)$, re-written more compactly as $$\ln Y_i + \ln \phi_i(Y) - d_i = 0 \quad (28)$$

The necessary condition for stability is thus $Y_T \equiv \Sigma Y_i \equiv \exp(-k) \leq 1$ at all stationary points.

To make an exhaustive search for stationary points and ensure that no unstable states are missed, the standard procedure requires equations (28) to be solved starting from both a 'light' and a 'heavy' trial phase.

The initial estimate in such calculations is based on the Wilson K-values, given at (T,P) by the expression:

$$\ln K_i^W = \ln(P_{ci}/P) + 5.373(1+w_i)(1-T_{ci}/T) \quad (29)$$

3.1 The Direct Solution Approach

This formulation, which through extensive testing has become the preferred for a compositional reservoir simulator, can be viewed as a Newton iteration applied directly to the system of defining relations for the reduced variables in terms of trial-phase moles. This is done while using the conditions of stationarity (28).

To make the above more concrete, consider the definition of reduced variables, (19), written in residual form for the trial-phase moles Y, $$r_\alpha \equiv \sum_{i=1}^c q_{\alpha i}Y_i - Y_T Q_\alpha \text{ for } \alpha = 1, \ldots, M \quad (30)$$

Invoking the condition of stationarity, (28), and observing that the term $\ln \phi_i$ can be viewed as a function of $Q_\alpha$, we can express the trial phase moles as functions of the reduced variables, i.e., $$Y_i(Q) = \exp(d_i - \ln \phi_i(Q)) \quad (31)$$

Taken together, equations (30)-(31) form a closed system that must be satisfied by the M unknown reduced variables $Q_\alpha$ at any stationary point of the TPD function:

$$r_\alpha \equiv \sum_{i=1}^c q_{\alpha i}Y_i(Q) - Y_T(Q)Q_\alpha \text{ for } \alpha = 1, \ldots, M \quad (32)$$

The Jacobian of the above system can be shown to have the form $$\frac{\partial r_\alpha}{\partial Q_\beta} \equiv \sum_{i=1}^c Y_i(Q_\alpha - q_{\alpha i})\frac{\partial \ln \phi_i(Q)}{\partial Q_\beta} - Y_T \delta_{\alpha\beta} \quad (33)$$

for $1 \leq \alpha, \beta \leq M$

The derivatives of the fugacity coefficient appearing in (33) can be calculated from the EOS via (24)

Following solution of the Newton system, $$\left(\frac{\partial r}{\partial Q}\right)^k \Delta Q^k = -r^k \quad (34)$$

the solution is updated via $$Q_\alpha^{k+1} = Q_\alpha^k + \Delta Q_\alpha \quad (35)$$

and the unnormalized moles are subsequently revised to satisfy the TPD stationarity relations (31), i.e., $$Y_i^{k+1} = \exp(d_i - \ln \phi_i(Q^{k+1})) \quad (36)$$

If the update (35) should violate the bounds (23) on the RVs, the update is abandoned and a conventional successive-substitution step is performed in its stead. This is accomplished by applying the step (36) with the old iterate $Q^k$.

4 Phase Split Algorithm in Reduced Variables

When the existence of two hydrocarbon phases has been established (through e.g. stability analysis) the compositions and amounts of the equilibrium phases must be calculated, traditionally by solving a set of c nonlinear equal-fugacity equations for e.g. the moles in the vapor phase.

In this section, a reduced variable approach is described which allows us to instead solve a set of (M+1) primary variables $X^P=(Q_1^P, \ldots, Q_M^P, \beta^P)$, where P designates a Primary phase and $\beta^P$ is the corresponding phase fraction.

In principle, either phase could be designated as primary and solved for; however, from a numerical standpoint it is better to solve for the least abundant phase, in particular near phase boundaries. Thus $(Q_1^V, \ldots Q_M^V, V)$ would be used near a bubble-point and $(Q_1^L, \ldots Q_M^L, L)$ near a dew-point.

The least-abundant phase may be determined by solving the Rachford-Rice equation for vapor fraction, based on the current feed composition $z_i$ and a previous guess for equilibrium K-values, $K_i \equiv y_i/x_i$.

The variables corresponding to the non-solution phase S (Secondary), are calculated from mass-balance:

$$\begin{cases} \beta^S = 1 - \beta^P \\ Q_\alpha^S = (Q_\alpha^F - \beta^P Q_\alpha^P)/\beta^S \end{cases} \quad (37)$$

Note that there is no possibility of division by zero, provided the assumption that the phase S is more abundant is correct.

Utilizing a methodology outlined in Firoozabadi, A. and Pan, H., "Fast and Robust Algorithm for Compositional Modeling: Part II—Two-Phase Flash", SPE 71603 solves the set of (M+1) equations (assuming Vapor is the primary phase), $$\begin{cases} \sum_{j=1}^c q_{\alpha j} y_j - Q_\alpha^P = 0, \quad \alpha = 1 \ldots M \\ \sum_{i=1}^c (y_i - x_i) = 0 \end{cases} \quad (38)$$

Using standard Rachford-Rice relations to express phase compositions in terms of K-values yields $$\begin{cases} \sum_{i=1}^c \frac{z_i K_i q_{\alpha i}}{1 + \beta^P(K_i - 1)} - Q_\alpha^P = 0, \quad \alpha = 1 \ldots M \\ \sum_{i=1}^c \frac{z_i(K_i - 1)}{1 + \beta^P(K_i - 1)} = 0 \end{cases} \quad (39)$$

The system (39) is closed, since K-values can be shown to depend only on the primary variables. Note also that the Rachford-Rice equation ($2^{nd}$ in the set (39)) is not solved separately in this formulation, but rather becomes part of the system of residuals.

4.1 Generalized K-value Form

The system (39) must be linearized in terms of $X^P$ for the least-abundant phase. To proceed, we now illustrate how the defining equations can be written generically in terms of P and S phases and "generalized" K-values, to make the phase-switching more convenient.

The Rachford-Rice expressions using K-values in the customary form are:

$$\begin{cases} x_i = \frac{z_i}{1 + V(K_i - 1)} = \frac{z_i}{L + K_i(1 - L)} \\ y_i = \frac{K_i z_i}{1 + V(K_i - 1)} = \frac{K_i z_i}{L + K_i(1 - L)} \end{cases}$$

Introducing reciprocal K-values $\hat{K}_i \equiv 1/K_i$ we see that $$\begin{cases} x_i = \frac{z_i}{L + K_i(1 - L)} = \frac{z_i}{L + \hat{K}_i^{-1}(1 - L)} = \frac{\hat{K}_i z_i}{1 + L(\hat{K}_i - 1)} \\ y_i = \frac{z_i}{1 + L(\hat{K}_i - 1)} \end{cases}$$

This example makes clear that by introducing generalized K-values which coincide with standard K-values when the primary phase is Vapor, and otherwise equal reciprocal K-values, i.e., $$\log \hat{K}_i = \log \phi_i^S - \log \phi_i^P \quad (40)$$

the secondary- and primary phase compositions are given by $$\begin{cases} x_i^S \equiv \frac{z_i}{(1 + \beta^P(\hat{K}_i - 1))} \equiv z_i \xi_i^P \\ x_i^P \equiv \hat{K}_i x_i^S \end{cases} \quad (41)$$

where $$\xi_i^P \equiv (1 + \beta^P(\hat{K}_i - 1))^{-1}$$

The phase-split conditions can now be written uniformly as:

$$\begin{cases} r_\alpha \equiv \sum_{i=1}^c z_i \hat{K}_i q_{\alpha i} \xi_i^P - Q_\alpha^P = \sum_{i=1}^c q_{\alpha i} x_i^P - Q_\alpha^P = 0, \text{ for } \alpha = 1 \ldots M \\ r_{M+1} \equiv \sum_{i=1}^c z_i(\hat{K}_i - 1) \xi_i^P = \sum_{i=1}^c (x_i^P - x_i^S) = 0 \end{cases} \quad (42)$$

4.2 System Jacobian

Designate the primary- and secondary variables $X^P=(Q_1^P, \ldots, Q_M^P, \beta^P)$, $X^S=(Q_1^S, \ldots, Q_M^S, \beta^S)$.

Given the derivatives of primary-/secondary phase compositions with respect to the primary variables, the system Jacobian is easily assembled from the residual definitions:

$$\begin{cases} \frac{\partial r_\alpha}{\partial X_\gamma^P} = \sum_{i=1}^c q_{\alpha i} \frac{\partial x_i^P}{\partial X_\gamma^P} - \delta_{\alpha\gamma} & \text{for } 1 \leq \alpha, \gamma \leq M \\ \frac{\partial r_\alpha}{\partial X_\gamma^P} = \sum_{i=1}^c q_{\alpha i} \frac{\partial x_i^P}{\partial X_\gamma^P} & \text{for } 1 \leq \alpha \leq M, \gamma = M + 1 \\ \frac{\partial r_{M+1}}{\partial X_\gamma^P} = \sum_{i=1}^c \left( \frac{\partial x_i^P}{\partial X_\gamma^P} - \frac{\partial x_i^S}{\partial X_\gamma^P} \right) & \text{for } 1 \leq \gamma \leq M + 1 \end{cases} \quad (43)$$

4.2.1 Derivatives of Phase Compositions

Recall formulae for the phase compositions in terms of generalized K-values, $$x_i^S = z_i/(1+\beta^P(\hat{K}_i-1)) \equiv z_i \xi_i^P$$

$$x_i^P = \hat{K}_i x_i^S$$

Setting for convenience $$\hat{K}_i^m \equiv \hat{K}_i - 1 \text{ and } v_i \equiv \frac{z_i}{(\xi_i^P)^2},$$

we find:

$$\begin{cases} \dfrac{\partial x_i^S}{\partial X_\alpha^P} = -v_i \beta_P \dfrac{\partial \hat{K}_i}{\partial X_\alpha^P} & 1 \le i \le c, 1 \le \alpha \le M \\ \dfrac{\partial x_i^S}{\partial X_\alpha^P} = -v_i \left( \beta_P \dfrac{\partial \hat{K}_i}{\partial X_\alpha^P} + \hat{K}_i^m \right) & 1 \le i \le c, \alpha = M+1 \end{cases} \quad (44)$$

and $$\begin{cases} \dfrac{\partial x_i^P}{\partial X_\alpha^P} = v_i \beta_S \dfrac{\partial \hat{K}_i}{\partial X_\alpha^P} & 1 \le i \le c, 1 \le \alpha \le M \\ \dfrac{\partial x_i^P}{\partial X_\alpha^P} = v_i \left( \beta_S \dfrac{\partial \hat{K}_i}{\partial X_\alpha^P} - \hat{K}_i \hat{K}_i^m \right) & 1 \le i \le c, \alpha = M+1 \end{cases} \quad (45)$$

4.2.2 Derivatives of Generalized K-values

From the definition of generalized K-values, $\hat{K}_i \equiv \phi_i^S/\phi_i^P$ it follows that $$\frac{\partial \hat{K}_i}{\partial X_\alpha^P} = \hat{K}_i \left( \frac{\partial \log \phi_i^S}{\partial X_\alpha^P} - \frac{\partial \log \phi_i^P}{\partial X_\alpha^P} \right) \quad \text{for } 1 \le \alpha \le M+2 \quad (46)$$

Using mass-balance, the primary variable derivatives of the secondary-phase fugacity can be written $$\frac{\partial \log \phi_i^S}{\partial X_\alpha^P} = -\frac{\beta_P}{\beta_S} \frac{\partial \log \phi_i^S}{\partial X_\alpha^S} \quad \text{for } 1 \le \alpha \le M, 1 \le i \le c \quad (47)$$

$$\frac{\partial \log \phi_i^S}{\partial X_\alpha^P} = \frac{1}{\beta_S^2} \left( \sum_{\gamma=1}^M \frac{\partial \log \phi_i^S}{\partial X_\gamma^S} (X_\gamma^F - X_\gamma) \right) \quad \text{for } \alpha = M+1, 1 \le i \le c$$

4.2.3 Derivatives of Fugacities

The derivatives of fugacity coefficients with respect to the RVs of the corresponding phase appearing in equations (46) and (47) follow directly from (24).

4.3 Newton Update

Following construction of the residuals (42) and assembly of the system Jacobian through equations (43)-(47), the Newton system $$\left( \frac{\partial r}{\partial X^P} \right)^k \Delta X^{P,k} = -r^k \quad (48)$$

can be solved, and new iterates generated from $$X^{P,k+1} = X^{P,k} + \Delta X^{P,k}$$

Figure 3:
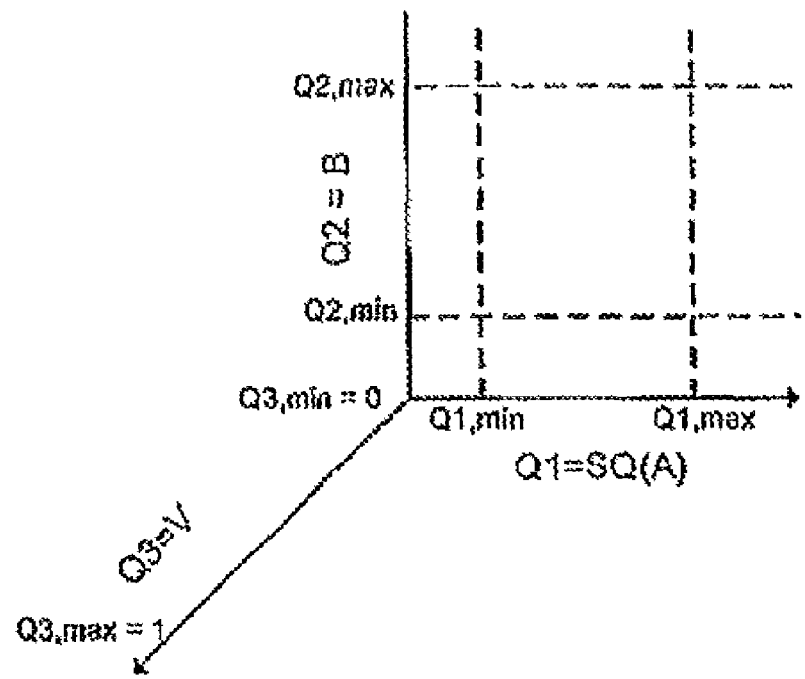
FIG. 3 illustrates physical limits applying to the reduced-variables for the purpose of safe-guarded Newton iterations.

As mentioned previously in conjunction with stability testing, the updated reduced variables must always satisfy the constraints (23). In the present case, the phase fraction $X_{M+1}^P \equiv \beta^P$ must also be safeguarded to ensure that the physical bounds $0 \le \beta^P \le 1$ are respected. See FIG. 3 which schematically shows these bounds.

If violation of these constraints should be detected at any point in the iterative sequence defined by (48), either the conditions specified correspond to single-phase, or a poor-quality initial guess precluded convergence. In such cases, it is preferable to terminate the iteration and continue with ab inito flash calculations.

5 Reservoir Flash—A Summary

Figure 1:
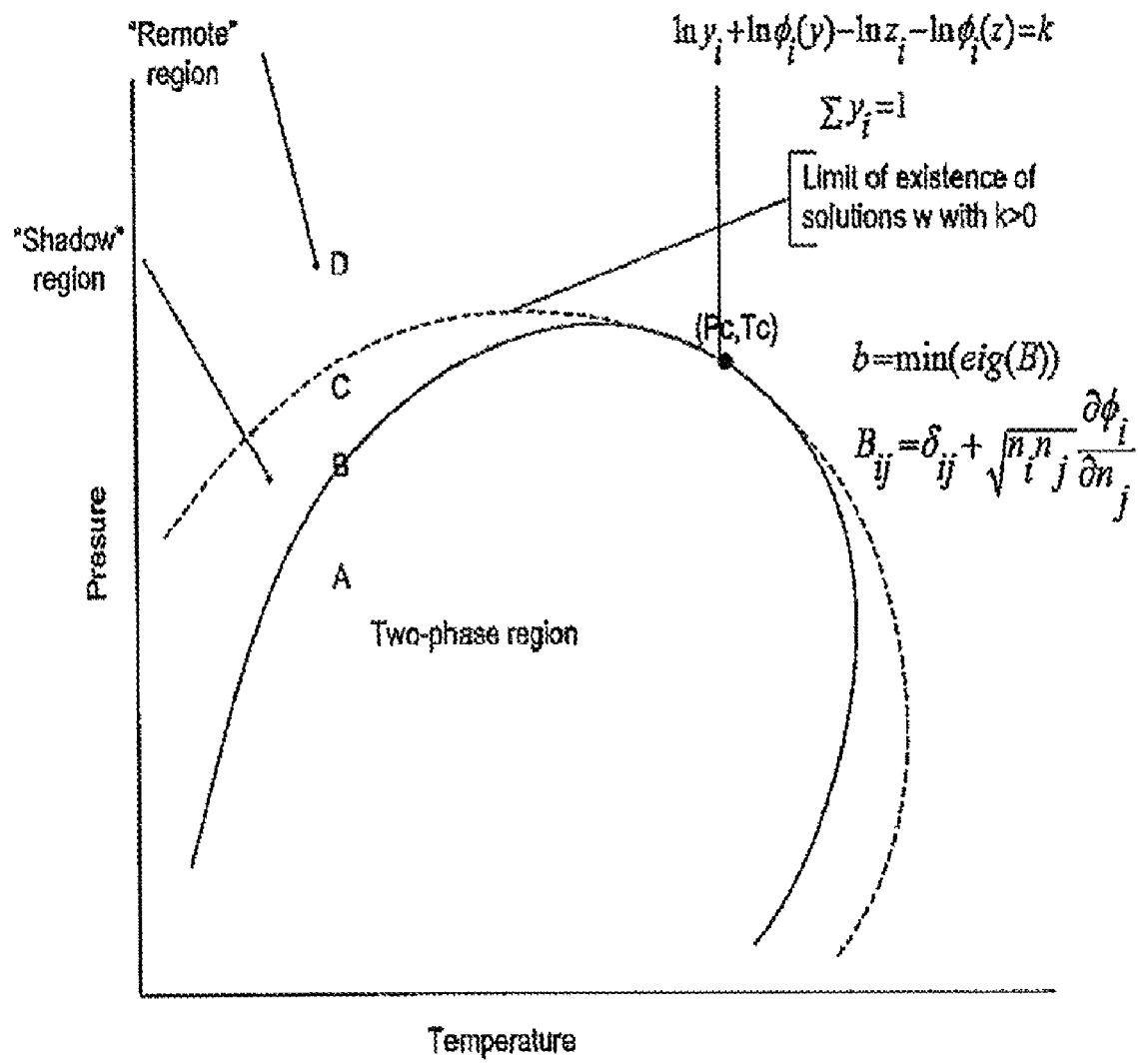
FIG. 1 is a pressure-temperature diagram delineating several regions in the phase-plane to illustrate concepts central to a conditional stability test approach.
Figure 2:
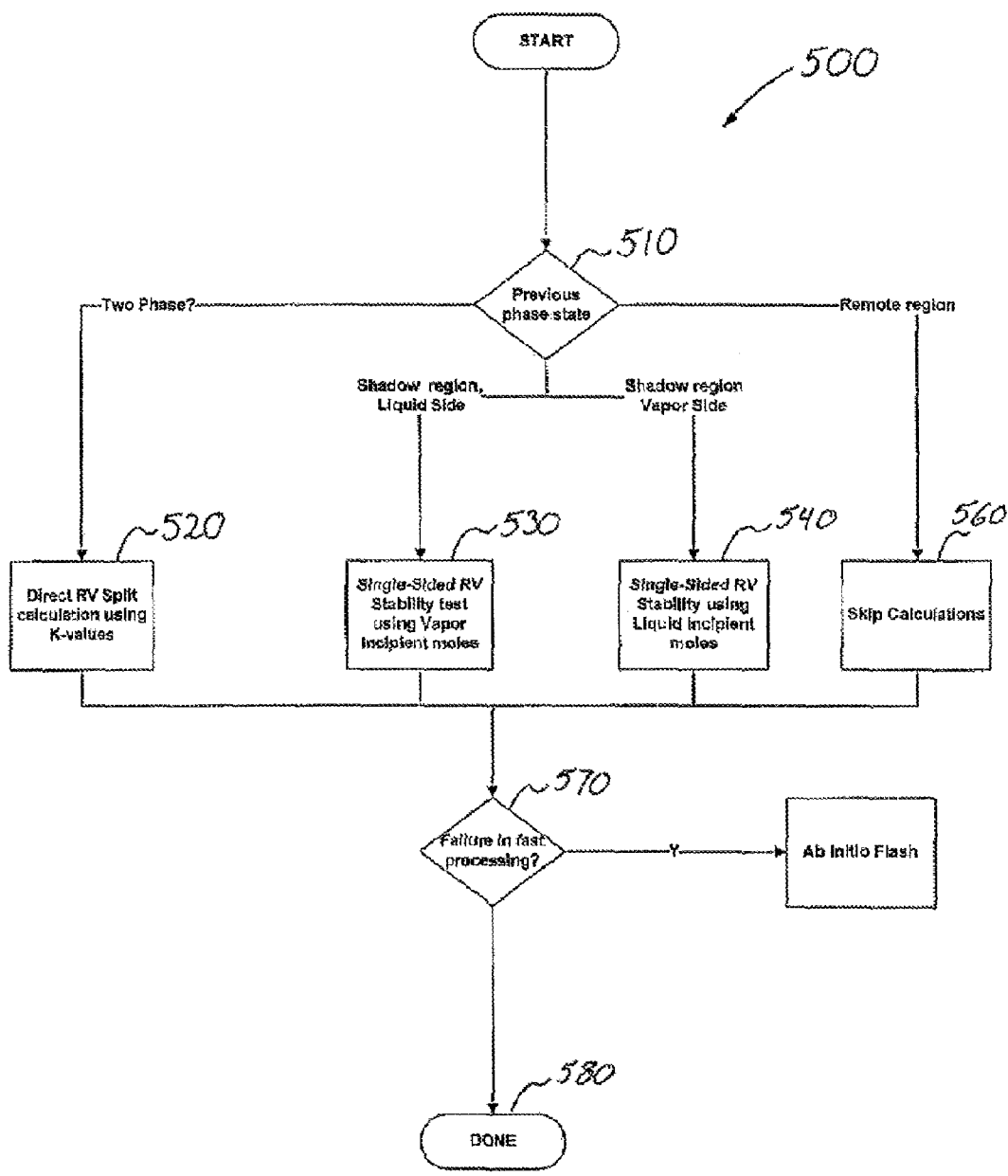
FIG. 2 is a flow-chart illustrating the combined usage of conditional stability test logic for the overall flash update, and reduced variable algorithms for iterative solution of the stability and phase-split problems at a particular time-step of a compositional reservoir simulator.

FIG. 4 is a functional block-diagram of a non-linear iteration loop including flash calculations made during computerized simulation of fluid flow according to the present invention in a subsurface hydrocarbon-bearing reservoir model. FIG. 2 is a flow-chart illustrating the combined usage of conditional stability test and reduced variable transformation for solving the flash problem at a particular time-step of a compositional reservoir simulator.

The PVT module in a reservoir simulator is always responsible for detecting the emergence of new phases in each computational grid cell, since this information cannot in any way be inferred from the set of primary variables and reservoir equations.

For cells in which coexisting equilibrium phases exist, the situation is different in the sense that a corresponding equilibrium constraint appears in the overall system of governing equations, $$r_i^f = x_i \phi_i^L(P,T,x) - y_i \phi_i^V(P,T,y) \text{ for } i=1,\ldots,c \quad (49)$$

It is possible to simply incorporate the residuals (49) with the rest of the system residuals; this implies that simulator and flash residuals converge together without any special flash calculations. The other possibility, known as "exact flash" is to determine equilibrium phases and compositions satisfying (49) to within a rigorous tolerance. In the exact flash approach, the residuals (49) are (numerically) zero due to flash iterations performed. Only derivatives of (49) with respect to simulator variables are required, to account for the contribution of equilibrium to the simulator Jacobian.

The exact flash policy is preferred, partly because it leads to a modular design, but principally because convergence of the highly nonlinear flash constraints frequently requires special treatment. In addition, the extra work inherent in performing exact flash calculations is more than offsets by faster convergence of the simulator nonlinear iteration, resulting from more accurate equilibrium phases.

Efficient application of the stability testing and phase-split algorithms presented in sections 3.1 and 4 to the repeated solution of flash problems encountered in the course of simulator time-stepping requires that careful use be made of pre-existing conditions of pressure, temperature and composition on the simulation grid.

5.1 Two Phase Region

Generally speaking, saturated cells are overwhelmingly more likely to remain two-phase than to transition into single-phase in subsequent iterations. Furthermore, in the vast majority of cases, the equilibrium phase compositions and -amounts already calculated provide an excellent starting point for new phase-split calculations at the updated cell conditions. Consequently, an attempt is always made to proceed directly to the Newton procedure described in section 4.3, using previous K-values as the initial guess and converging the governing equations (42) to a strict residual tolerance (default is $\epsilon_{split}=10^{-10}$) in a very small number of iterations. Excessive iterations, or overshoot in the iteration variables, in the unlikely event that they should occur, results in swift termination of the iteration in favor of Ab Initio flash calculations.

5.2 Single Phase Region

Cells which are undersaturated are far more likely to remain single-phase than to evolve additional phases; however, this can only be established with complete certainty through stability testing, and the traditional approach requires this testing to commence from a crude starting point, such as the Wilson K-values, equation (29), using both a 'light' and a 'heavy' trial phase, for each new condition encountered.

A worthwhile objective is to reduce the number of costly stability tests performed. This has been attempted in the past by limiting testing to certain candidate cells, such as those which border on clusters of existing two phase cells. However, such an algorithm is ultimately heuristic, and introduces a recursive component in the sense that once instability has been revealed, new neighbors must be tested. This has undesirable implications in the parallel simulator.

The preferred approach which is related to that of Claus P. Rasmussen, Kristian Krejbjerg, Michael L. Michelsen and Kersti E. Bjurstrom, *Increasing the Computational Speed of Flash Calculations with Applications for Compositional, Transient Simulations*, Society of Petroleum Engineers, SPE 84181, February 2006 SPE Reservoir Evaluation & Engineering is adopted, which will be referred to here as Conditional Stability Testing (CST). Instead of considering local grid conditions, this approach is based on monitoring each single-phase cell's approximate location in the phase plane. The picture below illustrates the cases that arise.

The single-phase region is subdivided into a "shadow" region (C) next to the phase boundary, characterized as the set of P and T for which the TPD equations (26) have one non-trivial solution with a corresponding positive value of the TPD. Beyond the shadow region is the remote region (D), in which only a trivial solution (y=z) to the TPD equations exists. The shadow zone thus acts as a buffer between states far into the single-phase region, and the two-phase region itself.

The central idea of CST is to attempt to skip stability calculations in zone (D), provided the magnitude of change experienced in a given cell is sufficiently small. For cells in region (C) stability testing is "single-sided" and commences with Newton iteration from the previously calculated, non-trivial solution with positive TPD.

However, as the width of the shadow zone can be shown to shrink to zero in the critical region, a measure of distance to the critical point is needed in order to safely skip calculations in zone (D). This measure, introduced by Michelsen, is given by the smallest Eigen value of the matrix $$B_{ij} = \delta_{ij} + \sqrt{n_i n_j}\left(\frac{\partial \ln \phi_i}{\partial n_j}\right)_{P,T,n_{k \neq j}} \quad (50)$$

When conditions $P^*, T^*, z_i^*$ in a cell are found to lie in region (D), the matrix (50) is calculated and its smallest Eigen value $\lambda_B^* = \min(\text{eig}(B))$ determined. All values marked (*) are then stored for re-use.

In subsequent calculations at new conditions $P, T, z_i$, define state-variable changes with respect to base point as $$\Delta P = P - P^*, \Delta T = T - T^*, \Delta z_i = z_i - z_i^* \quad (51)$$

A computational tolerance is established by scaling a user-supplied tolerance parameter (default value $\epsilon_A = 0.1$) by the tabulated, approximate distance from the critical point, $\epsilon = \epsilon_A \lambda_B^*$.

The stability test can be skipped at new conditions, provided the following conditions are all satisfied:

$$\begin{cases} \Delta P / P^* < \epsilon \\ \Delta T / T^* < \epsilon \\ \Delta z_i / z_i^* < \epsilon \end{cases}$$

5.3 Ab Initio Flash Calculations

In the procedures outlines in sections 5.1 and 5.2 above, the possibility for algorithmic failure exists. For example, an assumed two-phase state may in reality be single phase; or, the quality of the initial guess insufficient to allow convergence in Newton's method. Analogously, a single-phase state previously located in the shadow or remote region may have experienced a change in conditions which is too large to allow the inference that the fluid remains stable as a single phase. In such cases, and for situations when no initial information is available, the Ab Initio (lat. "from the beginning") flash calculation is required. The present approach is based on Michelsen's work. The main difference relates to the use of the reduced variable technique of section 3.1 for the stability testing step.

To begin the exposition, note that for two phases of assumed compositions x, y, the difference in GFE with the fluid when viewed as single phase can be expressed as:

$$\Delta G \equiv (1-\beta)\Sigma x_i(\log x_i + \log \phi_i^L) + \beta\Sigma y_i(\log y_i + \log \phi_i^V) - \Sigma z_i(\log z_i + \log \phi_i^F)$$

Using mass-balance $z_i = (1-\beta)x_i + \beta y_i$ this can be written $$\Delta G = (1-\beta)\Sigma x_i(\log x_i + \log \phi_i^L - \log z_i - \log \phi_i^F) + \beta\Sigma y_i(\log y_i + \log \phi_i^V - \log z_i - \log \phi_i^F)$$

or, recognizing the tangent-plane distances of the liquid and vapor compositions, $$\Delta G = (1-\beta)TPD(x) + \beta TPD(y)$$

If compositions x, y can be found, satisfying mass-balance, with $\Delta G < 0$, the mixture $z_i$ is unstable at the current conditions P and T. In addition, if either $TPD(x) < 0$ or $TPD(y) < 0$ the mixture is also unstable (in practice, a small threshold value is used instead of zero; default setting is $TPD < \epsilon_{stab} = -10^{-11}$). In such situations, stability testing is redundant.

The steps of the Ab Initio algorithm are as follows:

First, evaluate $\phi_i(P,T,z)$, the Gibbs Free Energy of the feed and the Wilson K-values $K_i^W$ using equation (29). Next, perform three cycles of successive substitution. If during this process $\Delta G < 0.0$ is observed the feed is unstable and the current compositions can be used in subsequent split calculations. If instead it is the case that $TPD(x) < 0$ or $TPD(y) < 0$ the same conclusion applies. The selection of estimates will now be based on which phase indicated instability, e.g., if $TPD(x) < 0$ then estimate K-values as $\log K_i \leftarrow \log \phi_i^L(x) - \log \phi_i^F$. If after three iterations instability has not been revealed, no definite conclusion is possible and a full stability test is performed.

If instability is detected, either through stability testing or the SS approach outlined above, estimates are now available for which the objective function ΔG is negative. Three additional cycles, each consisting of three SS iterations are applied, each followed by an attempt to accelerate the process. Only convergence to a minimum of the GFE is possible in this approach. If convergence tolerance is met following completion of the cycles, the algorithm terminates; if not, a $2^{nd}$ order rigorous GFE minimization algorithm, enforcing strict descent, is applied for the final convergence. Consequently, the trivial solution is always avoided, and convergence to a minimum of the GFE is guaranteed.

5.4 Phase Labeling

Once it has been verified that the fluid of composition $z_i$ is stable as a single phase at the prevailing pressure and temperature, a label of either 'oil' or 'gas' must be assigned to it, the principal reason being the need to apply the correct relative permeability table in calculating flow properties of the phase.

It is important to point out, however, that such a distinction gradually becomes meaningless as the critical point is approached, and that at present, no universally accepted methodology for labeling exists—current simulators show a great deal of variability in this regard. From a physical standpoint, flow properties of a phase cannot reasonably depend on this label as the phases become indistinguishable.

While it seems clear that the most rigorous approach to the labeling problem is the determination of the mixture true critical point, this is a costly process, and an accurate determination may not be required, particularly if properties are extrapolated between oil and gas near the true or approximate critical point.

For these reasons, the present simulator uses a simple correlation for pseudo-critical temperature, which can be expected to be accurate enough to allow correct labeling of the phase well away from miscible conditions. This so-called Li-correlation represents a weighted average of the component critical temperatures, $$\tilde{T}_{crit} = \Gamma \frac{\sum_{i=1}^{c} T_{c_i} V_{c_i} z_i}{\sum_{i=1}^{c} V_{c_i} z_i} \qquad (52)$$

Here Γ is a correction factor that is typically unity, unless the model has been tuned to match initialization data, e.g. the location of a gas-oil contact.

Using (52), at the operating temperature T a fluid satisfying $T<\tilde{T}_{crit}$ is labeled oil; otherwise, gas.

Referring again to FIG. 4 a method for reservoir simulation is illustrated. In step 100, reservoir model and reservoir data is imputed. The fluid phase properties and equations of state are calculated in step 110. Such calculations can be those described in sections 1-4 herein. A Jacobian Matrix is generated in step 120 can be as taught in sections 1-4.2 herein. The linear equations are then solved in step 130 pursuant to the teachings of sections 1-4.2.3. The solution is then updated in step 140 pursuant to the teachings of section 1-4.3. Then the solution is tested for stability or convergence pursuant to the teachings of sections 1-4.2.3. Then the calculated solution is output for the user in step 160.

Figure 5:
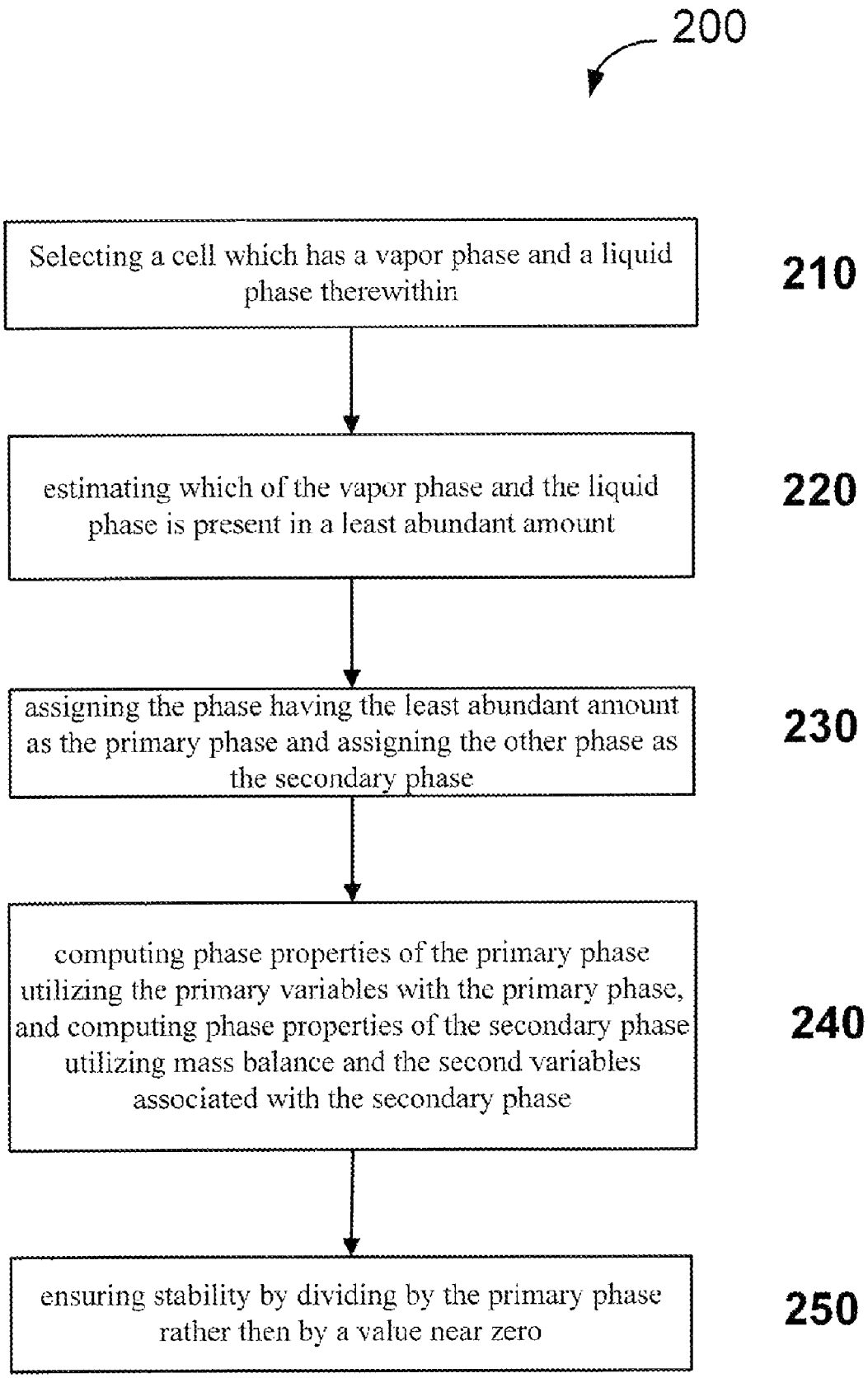
FIG. 5 is a functional block-diagram of an embodiment of a method in accordance with the present invention.

Referring to FIG. 5, a method 200 for reservoir simulation is illustrated. In step 210, a cell is selected which has a vapor phase and a liquid phase within the cell. An estimated is made as to which of the vapor phase and the liquid phase is present in a least abundant amount in step 220. In step 230, the phase having the least abundant amount is assigned as the primary phase, and the other phase is assigned as the secondary phase. In step 240, the phase properties of the primary phase are computed utilizing the primary variables with the primary phase, and the phase properties of the secondary phase are also computed utilizing mass balance and the second variables associated with the secondary phase. In step 250, stability is ensured in the calculations by dividing by the primary phase rather then by a value near zero.

In the method, the phase properties of the primary and secondary phases can include pressure, temperature, and pressure of the primary phase. In the method, the phase properties of the primary and secondary phases can include pressure, temperature, pressure, composition and amount of the primary phase.

In the method, the calculations of step 240 can further comprise the following steps for calculating the phase properties of the primary and secondary phases: (i) utilizing a reduced variable algorithm with the primary and secondary variables associated with the primary and secondary phases, which produces a Rachford-Rice expression; (ii) linearizing the Rachford-Rice expression with K-values and reciprocal K-values, thereby creating linear expressions; (iii) generating a Jacobian Matrix utilizing the primary and secondary variables; and (iv) solving the linear expressions and the Jacobian Matrix to update the phase properties and test for stability. Such steps are taught in sections 1-4.2.3 herein. In the method above, step (iii) can also include the steps of: (1) calculating derivatives of the phase compositions; (2) calculating derivatives of the K-values; and (3) calculating derivatives of fugacity coefficients corresponding to each of the primary and secondary variables.

Figure 6:
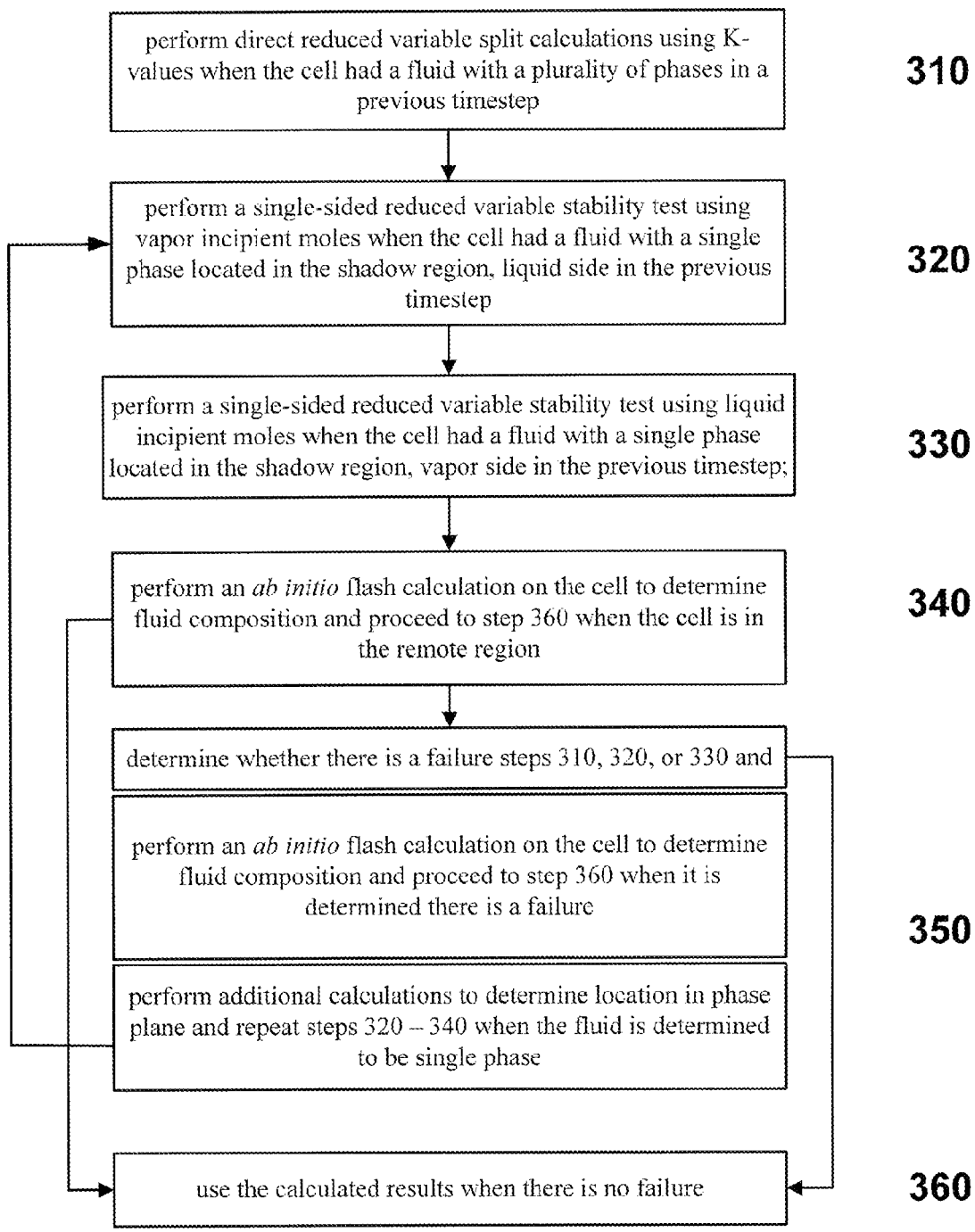
FIG. 6 is a functional block-diagram of another embodiment of a method in accordance with the present invention.

Referring to FIGS. 2 and 6, another method 300 is illustrated for determining the composition of fluid in a cell during a computer enabled reservoir simulation. In step 310, direct reduced variable split calculations are performed using K-values when the cell had a fluid with a plurality of phases in a previous timestep. In step 320, a single-sided reduced variable stability test is performed using vapor incipient moles when the cell had a fluid with a single phase located in the shadow region, liquid side in the previous timestep. In step 330, a single-sided reduced variable stability test is performed using liquid incipient moles when the cell had a fluid with a single phase located in the shadow region, vapor side in the previous timestep. In step 340, an ab initio flash calculation is performed on the cell to determine fluid composition and proceed to step 360 when the cell is in the remote region. The ab initio calculation can be as taught in section 5.3 herein. In step 350, there is a determination of whether there is a failure in steps 310, 320, or 330. In step 350, an ab initio flash calculation is also performed on the cell to determine fluid composition, and then the method proceeds to step 360 when it is determined there is a failure. In step 350, when the fluid is determined to be single phase, additional calculations are performed to determine location in phase plane, and steps 320-340 are repeated. In step 360, the calculated results are used when there is no failure.

Figure 7:
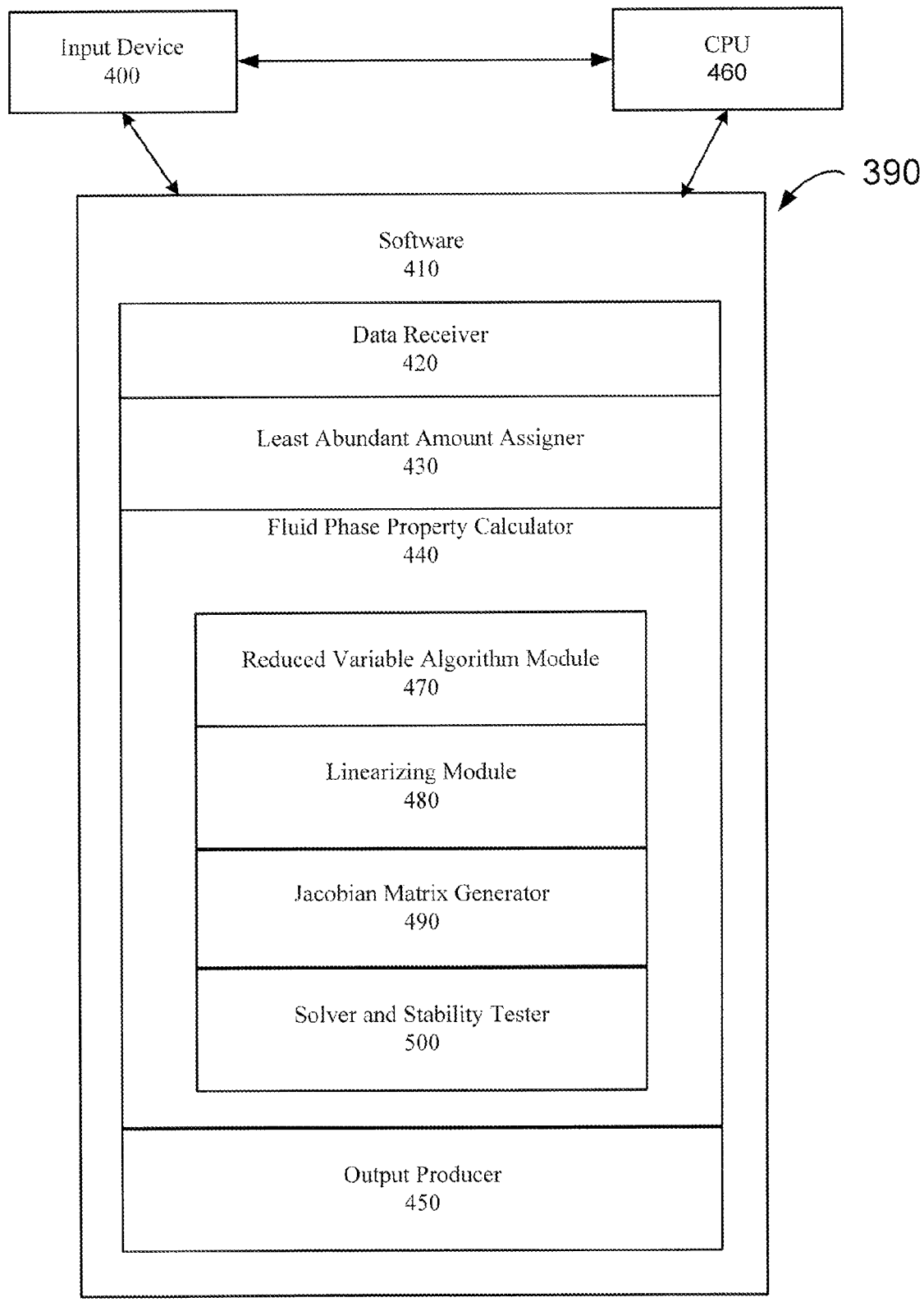
FIG. 7 is a schematic representation of an embodiment of a system and computer readable media in accordance with the present invention.

Referring to FIG. 7, within a system 390, a computer readable media 410 is illustrated that is utilized during a reservoir simulation for determining the composition of fluid in a cell. As will be readily appreciated by those skilled in the art, the computer readable media can also be a component of a system in which the computer readable media or software 410 interacts with an input device 400, such as a computer terminal, and a central processing unit (CPU) 460. Those skilled in the art will also readily appreciate such a system can also be part of a computer network. The computer media 410 includes a data receiver 420 that receives input reservoir model and data from a source. The computer media 410 also includes a least abundant amount assigner 430 that estimates which of a vapor phase and a liquid phase of the fluid in the cell is present in a least abundant amount responsive to the input data received by the data receiver. The least abundant amount assigner 430 also assigns the phase having the estimated least abundant amount as the primary phase and assigns the other phase as the secondary phase.

The computer media 410 also includes a fluid phase property calculator 440 that computes phase properties of the primary phase utilizing the primary variables with the primary phase. The fluid phase property calculator 440 also computes phase properties of the secondary phase utilizing mass balance and the second variables associated with the secondary phase. The fluid phase property calculator 440 thereby ensures stability by dividing by the primary phase rather then by a value near zero. The computer media 410 also includes an output producer 450 that is adapted to produce and communicate the calculated phase properties of the fluid to a readable format, for instance to a screen of a monitor or to a printer.

In the computer readable media 410, the fluid phase property calculator 440 can also include a reduced variable algorithm module 470 that produces a Rachford-Rice expression with the primary and secondary variables associated with the primary and secondary phases. The fluid property calculator 440 can also include a linearizing module 480 that creates linear expressions from the Rachford-Rice expression with K-values and reciprocal K-values. The fluid property calculator 440 can also include a Jacobian Matrix generator 490 that generates a Jacobian Matrix utilizing the primary and secondary variables. The fluid property calculator 440 can also include a solver and stability tester 500 that solves the linear expressions and the Jacobian Matrix to update the phase properties and test for stability. The Jacobian Matrix generator 490 can also have a phase composition derivative submodule that calculates derivatives of the phase compositions; a K-value submodule that calculates derivatives of the K-values; and a fugacity submodule that calculates derivatives of the fugacity coefficients corresponding to each of the primary and secondary variables.

Referring to FIGS. 2 and 6, another method 500 is illustrated for determining the composition of fluid in a cell during a computer enabled reservoir simulation. Step 510 is determining whether the cell had a single phase or a plurality of phases in a previous timestep. From step 510, other steps are performed depending upon where the determination in step 510. Step 520 is performed if the cell had a plurality of phases in the previous timestep. In step 520 direct reduced variable split calculations are performed using K-values. Step 530 is performed if the cell had a single phase in the previous timestep and was located in the shadow region, liquid side in a phase plane. In step 530 a single-sided reduced variable stability test is performed using vapor incipient moles. Step 540 is performed if the cell had a single phase in the previous timestep and was located in the shadow region, vapor side of the phase plane. In step 540, a single-sided reduced variable stability test is performed using liquid incipient moles. Step 560 is performed if the cell is in the remote region of the phase plane. In step 560 an ab initio flash calculation on the cell is performed to determine fluid composition. In step 560, after performing the ab initio calculation, the method then proceeds to step 580. Step 570 is performed after performing steps 520-540 in order to determine whether there is a failure in fast processing. If there is a failure, then an ab initio flash calculation is performed on the cell to determine fluid composition. If the fluid is found to be single phase, additional calculations are performed to determine location in phase plane to be used in subsequent iterations.

Step 580 is then performed if there is no failure. In step 580 the calculated results are used.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

For example, the present invention also includes a system and computer readable media carrying instructions for performing a compositional reservoir simulation of a subterranean hydrocarbon-bearing reservoir. This system, including computer hardware and storage, will carry out the method of reservoir simulation outlined above. Similarly, the computer readable media carries instructions for performing a compositional reservoir simulation of a subterranean hydrocarbon-bearing reservoir in accordance with the principles described above.

What is claimed is:

1. A method for compositional reservoir simulation of fluid flow within a subterranean reservoir, the method comprising:
    (a) providing a model of a subterranean reservoir, the model having a grid defining a plurality of cells such that each cell is associated with fluid therewithin, the fluid residing in a vapor phase and a liquid phase;
    (b) selecting at least one cell of the plurality of cells that is associated with fluid residing in the vapor phase and with fluid residing in the liquid phase;
    (c) estimating which of the vapor phase and the liquid phase is present in a least abundant amount;
    (d) assigning the phase having the least abundant amount as the primary phase and assigning the other phase as the secondary phase;
    (e) computing phase properties of the primary phase responsive to primary variables associated with the primary phase and computing phase properties of the secondary phase utilizing mass balance and responsive to secondary variables associated with the secondary phase, such that stability is ensured while computing the phase properties of the secondary phase due to assigning the phase having the least abundant amount as the primary phase in step (d); and
    (f) outputting a visual display responsive to the computed phase properties of the primary phase and the computed phase properties of the secondary phase.

2. The method of claim 1, wherein the phase properties of the primary phase comprise pressure, temperature, and composition and amount of the primary phase.

3. The method of claim 1, wherein the phase properties of the secondary phase comprise pressure, temperature, and composition and amount of the secondary phase.

4. The method of claim 1, wherein step (e) further comprises the following steps for computing the phase properties of the primary and secondary phases;
    (i) utilizing a reduced variable algorithm with the primary and secondary variables associated with the primary and secondary phases, which produces a Rachford-Rice expression;
    (ii) linearizing the Rachford-Rice expression with K-values and reciprocal K-values, thereby creating linear expressions;
    (iii) generating a Jacobian Matrix utilizing the primary and secondary variables; and (iv) solving the linear expressions and the Jacobian Matrix to update the phase properties and test for stability.

5. The method of claim 4, wherein step (iii) further comprises:
   (1) calculating derivatives of the phase compositions;
   (2) calculating derivatives of the K-values; and
   (3) calculating derivatives of fugacity coefficients corresponding to each of the primary and secondary variables.

6. A system that is utilized during a reservoir simulation for determining the composition of fluid in a cell, the system comprising:
   a data receiver that receives input from a source, the input comprising a reservoir model and data;
   a computer processor;
   a software program executable on the computer processor, the software program comprising:
      (a) a least abundant amount assigner module that
         (i) estimates which of a vapor phase and a liquid phase of the fluid in the cell is present in a least abundant amount responsive to the input received by the data receiver; and
         (ii) assigns the phase having the estimated least abundant amount as the primary phase and assigns the other phase as the secondary phase;
      (b) a fluid phase property calculator module that
         (i) computes phase properties of the primary phase responsive to primary variables associated with the primary phase; and
         (ii) computes phase properties of the secondary phase utilizing mass balance and responsive to second variables associated with the secondary phase, the fluid phase property calculator ensuring stability while computing the phase properties of the secondary phase due to the least abundant amount assigner module assigning the phase having the estimated least abundant amount as the primary phase; and
      (c) an output producer module that is adapted to produce and communicate the calculated phase properties of the fluid to a readable format; and
   a visual display in communication with the software program to display the readable format of the calculated phase properties produced by the output producer module.

7. The system of claim 6, wherein the fluid phase property calculator comprises:
   a reduced variable algorithm module that produces a Rachford-Rice expression with the primary and secondary variables associated with the primary and secondary phases;
   a linearizing module that creates linear expressions from the Rachford-Rice expression with K-values and reciprocal K-values;
   a Jacobian Matrix generator that generates a Jacobian Matrix responsive to the primary and secondary variables; and
   a solver and stability tester that solves the linear expressions and the Jacobian Matrix to update the phase properties of the primary and secondary phases and test for stability.

8. The system of claim 7, wherein the Jacobian Matrix generator further comprises:
   a phase composition derivative submodule that calculates derivatives of the primary and secondary phase compositions;
   a K-value submodule that calculates derivatives of the K-values; and
   a fugacity submodule that calculates derivatives of fugacity coefficients corresponding to each of the primary and secondary variables.

* * * * *